(12) United States Patent
Henryson et al.

(10) Patent No.: US 11,803,852 B1
(45) Date of Patent: Oct. 31, 2023

(54) DETECTION AND INTERVENTION FOR ANOMALOUS TRANSACTIONS

(71) Applicant: Wells Fargo Bank, N.A., San Francisco, CA (US)

(72) Inventors: Stacy R. Henryson, Clive, IA (US); Shawn Hetrick, San Francisco, CA (US); Heather C. Pemble, Johnston, IA (US); John Quinnell, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 636 days.

(21) Appl. No.: 16/428,021

(22) Filed: May 31, 2019

(51) Int. Cl.
*G06Q 20/40* (2012.01)
*G06N 3/044* (2023.01)

(52) U.S. Cl.
CPC ......... *G06Q 20/4016* (2013.01); *G06N 3/044* (2023.01)

(58) Field of Classification Search
CPC ............... G06Q 20/20; G06Q 30/0205; G06Q 30/0206; G06Q 30/0253; G06Q 30/0255; G06Q 30/0264; G06Q 30/0268; G06Q 30/0631; G06Q 20/0457; G06Q 20/10; G06Q 20/3676; G06Q 20/401; G06Q 30/0201; G06Q 30/0283; G06Q 40/025; G06Q 40/08; G06Q 20/4016; G06Q 30/0185; A61B 6/583; G06F 16/30; G06F 16/951; G06F 17/18; G06F 16/26; G06F 16/285; G06F 9/542; G06F 16/9035; G06K 9/40; G06K 9/6256; G06K 9/6267; G06K 9/6268; G06K 9/6218; G06K 9/6257; G06K 9/6276; G06K 9/628; G06T 9/40; G06T 9/6256; G06T 9/6267; G06T 9/6268; G06T 9/6218; G06T 9/6257; G06T 9/6276; G06T 9/628; Y10S 707/917; Y10S 707/99942; G05D 707/917; G05D 707/99942;
(Continued)

(56) References Cited

U.S. PATENT DOCUMENTS 7,668,769 B2   2/2010   Baker et al.
8,090,721 B2   1/2012   Fogel
(Continued)

OTHER PUBLICATIONS

Bhusari et al., "Application of Hidden Markov Model in Credit Card Fraud Detection", International Journal of Distributed and Parallel Systems, vol. 2, No. 6, Nov. 2011. 9 pages.
(Continued)

*Primary Examiner* — Lynda Jasmin
*Assistant Examiner* — Kimberly L Evans
(74) *Attorney, Agent, or Firm* — Foley & Lardner LLP

(57) ABSTRACT

Disclosed are methods, systems, and devices for identifying anomalous and/or problematic payments based on past payment patterns of a user, past experiences with the user, and the user's circumstances, and implementing intervention mechanisms for proactively resolving account issues before downstream impacts, such as collections calls, inbound calls, and complaints. Anomalous payments may be detected using clustering and prediction. Interventions may include phone calls, emails, notifications, etc. An alert or notification may be sent to the user's mobile application, and various selectable response options suited to the situation may be presented to the user.

20 Claims, 11 Drawing Sheets

(58) Field of Classification Search
CPC ........ G06N 20/00; G06N 20/20; G06N 5/003;
G06N 5/04; G06N 7/005; G06N 3/0445;
G06N 3/0454; G06N 3/088; G08G
5/0043; G10L 15/065; G10L 15/142;
G06V 10/762; G06V 10/82
USPC .... 705/1.1, 28, 30, 26.41, 35, 40, 44, 5, 38,
705/318, 14; 726/4, 23; 706/12;
707/687
See application file for complete search history.

(56) References Cited

U.S. PATENT DOCUMENTS

| | | | |
|---|---|---|---|
| 8,688,557 B2 | 4/2014 | Rose et al. | |
| 8,768,838 B1 * | 7/2014 | Hoffman | G06Q 40/00 |
| | | | 705/44 |
| 8,930,295 B2 | 1/2015 | Campbell et al. | |
| 10,019,744 B2 | 7/2018 | Adjaoute | |
| 10,091,180 B1 * | 10/2018 | Moritz | H04L 67/306 |
| | | | 705/30 |
| 2002/0099649 A1 * | 7/2002 | Lee | G06Q 40/06 |
| | | | 705/38 |
| 2005/0222929 A1 | 10/2005 | Steier et al. | |
| 2012/0158542 A1 * | 6/2012 | Nahari | G06Q 30/0613 |
| | | | 705/26.41 |
| 2013/0346302 A1 * | 12/2013 | Purves | G06Q 20/102 |
| | | | 705/40 |
| 2014/0058763 A1 | 2/2014 | Zizzamia et al. | |
| 2015/0161741 A1 | 6/2015 | Unser et al. | |
| 2016/0364794 A1 | 12/2016 | Chari et al. | |
| 2017/0140382 A1 | 5/2017 | Chari et al. | |
| 2017/0186007 A1 * | 6/2017 | Lam | G06Q 20/401 |
| | | | 705/5 |
| 2018/0041595 A1 * | 2/2018 | Dintenfass | H04W 4/20 |
| | | | 705/44 |
| 2018/0144041 A1 | 5/2018 | Chen et al. | |
| 2018/0276541 A1 | 9/2018 | Studnitzer et al. | |
| 2019/0043055 A1 | 2/2019 | Kar et al. | |
| 2019/0050862 A1 * | 2/2019 | Oka | G06Q 20/00 |
| | | | 705/28 |
| 2019/0058719 A1 * | 2/2019 | Kar | H04L 63/1416 |
| | | | 726/23 |
| 2020/0184556 A1 * | 6/2020 | Celia | G06Q 30/0206 |
| | | | 705/14 |
| 2020/0302234 A1 * | 9/2020 | Walters | G06F 16/9035 |
| | | | 706/12 |
| 2020/0356544 A1 * | 11/2020 | Chakraborty | G06F 16/2365 |
| | | | 707/687 |
| 2021/0304207 A1 * | 9/2021 | Lo Faro | G06Q 40/02 |
| | | | 705/44 |
| 2022/0383325 A1 * | 12/2022 | Hoffman | G06Q 20/20 |
| | | | 705/44 |

OTHER PUBLICATIONS

Dhok et al., "Credit Card Fraud Detection Using Hidden Markov Model", International Journal of Advanced Research in Computer Science, vol. 3, No. 3, May-Jun. 2012. 5 pages.

Jadhav et al., "Anomaly Detection Using Hidden Markov Model", International Journal of Computational Engineering Research, vol. 3, Issue 7, Jul. 2013. 8 pages.

Khan et al., "Implement Credit Card Fraudulent Detection System Using Observation Probabilistic in Hidden Markov Model", NIRMA University International Conference of Engineering, NUiCONE—2012, Dec. 6-8, 2012. 6 pages.

* cited by examiner

Payment Sequence

| | 1st | 2nd | 3rd | 4th |
|---|---|---|---|---|
| | 1350.61 | 1350.61 | 1350.61 | 1350.61 |
| | 5th | 6th | 7th | 8th |
| | 1350.61 | 1350.61 | 1350.61 | 1350.61 |
| | 9th | 10th | 11th | 12th |
| | 1350.61 | 300 | 1350.61 | 270 |

Cluster: A
1350.61
1350.61  1350.61
1350.61  1350.61
1350.61  1350.61
1350.61

Cluster: B
300

Cluster: C
270

FIGURE 3A

| | 1st | 2nd | 3rd | 4th | 5th | 6th | 7th | 8th | 9th | 10th | 11th | 12th |
|---|---|---|---|---|---|---|---|---|---|---|---|---|
| Actual | A | A | A | A | A | A | A | A | A | B | A | C |
| Trained | A | A | A | A | A | A | A | A | A | B | A | ■ |

Predictor  Probability A   Probability B   Probability C   'C' is anomalous
                75%            13%            12%

FIGURE 3B

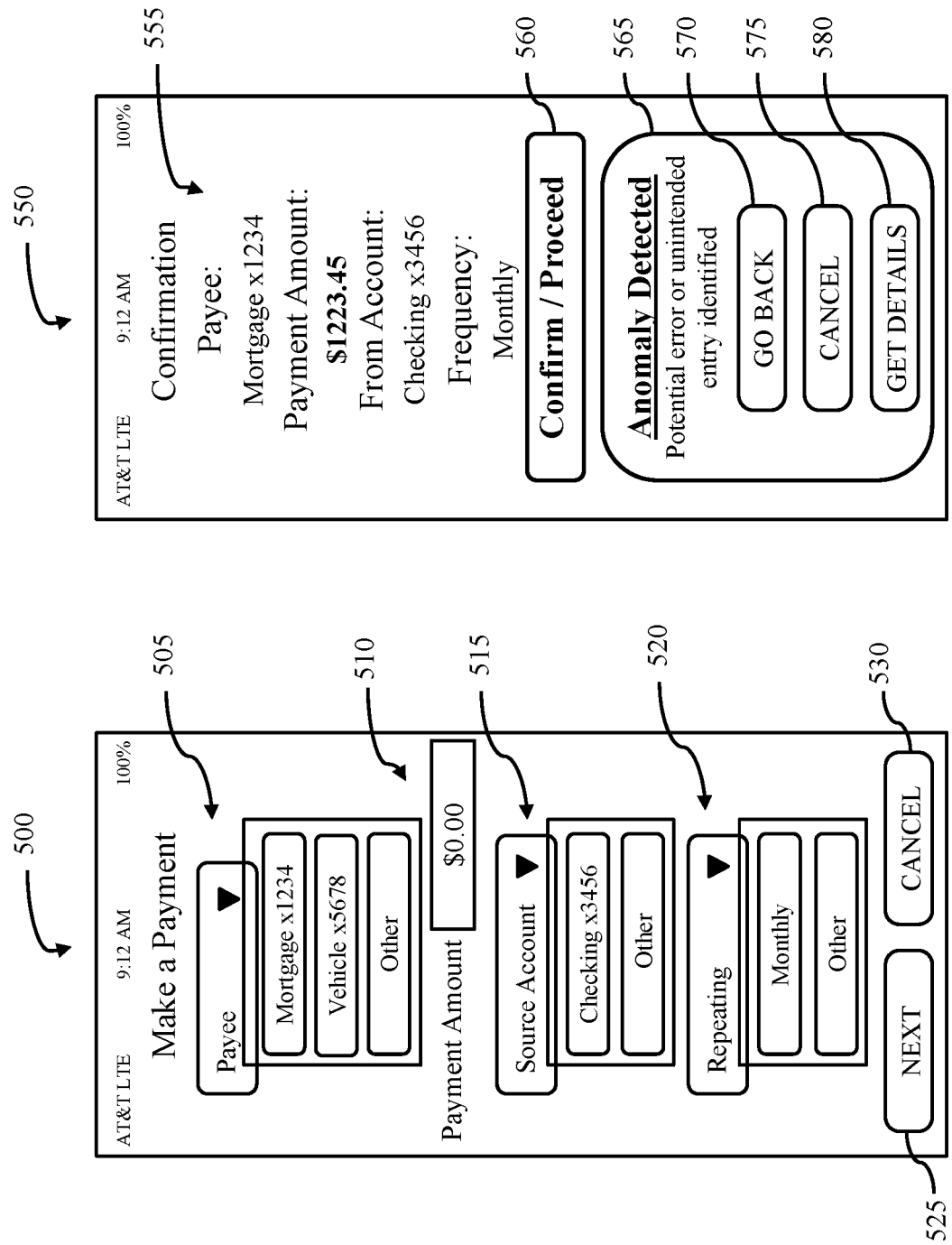

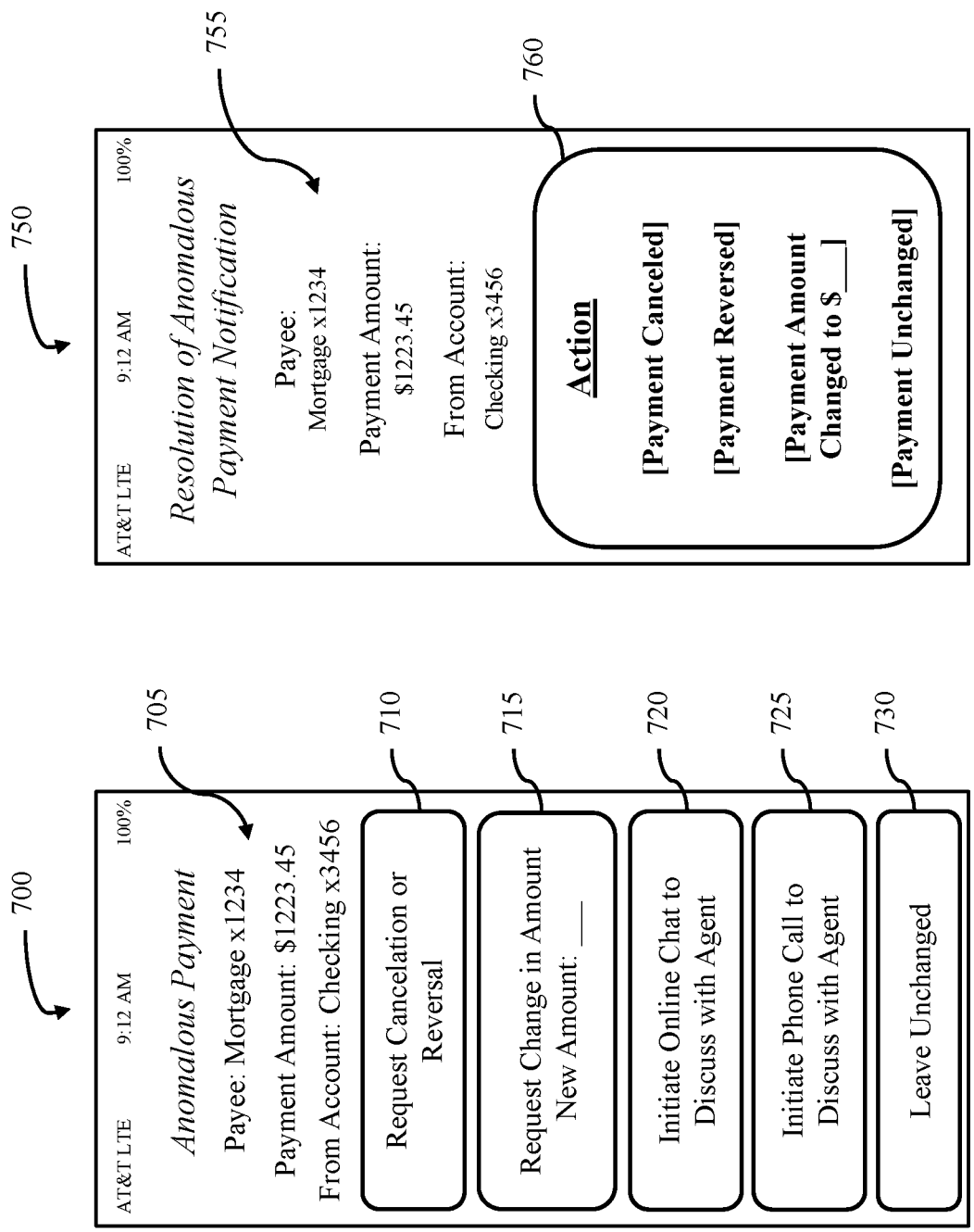

DETECTION AND INTERVENTION FOR ANOMALOUS TRANSACTIONS

TECHNICAL FIELD

The present disclosure relates generally to detection of anomalous behavior and responses thereto, and to identification of anomalous and/or problematic payments or other transactions and proactive interventions therefor.

BACKGROUND

Users are able to make payments more easily because of such conveniences as mobile applications, automated payments, and reduction or elimination of the need to submit paper checks in person or via snail mail. Although making payments has become easier, the process for detecting and resolving unintended and/or erroneous payments has stayed much the same. Payers are expected to shoulder the responsibility for monitoring transactions and engaging in potentially onerous processes for correcting errors that may not even be their own. For example, an account holder may request that an automatic draft be terminated (so that an amount due is not automatically paid from the corresponding account) and may instead pay the next amount over the phone. If the termination of the automatic draft is not correctly or timely processed by the institution, the account may be drafted a second time despite the account holder having already manually made the payment over the phone. If there were insufficient funds in the account because the over-the-phone payment depleted the account, the account holder may be charged an overdraft fee and would lose access to the funds that were mistakenly taken out of the account. The account holder would then have to contact the institution to explain the situation, wait to see if the situation is resolved, potentially contact the institution again to check on status and explain the situation again, and wait again. All the while, the account holder does not have the withdrawn funds available to use, and he or she loses an inordinate amount of time attempting to correct the error.

SUMMARY

Various embodiments of the disclosure relate to a method that may be implemented by a provider computing system. The method may comprise generating a set that includes payments made from a first account to a second account. The set of payments may be generated via a tracking device that tracks payments by a user. The payments in the set of payments may be past payments, such as payments already approved and processed. The first account and/or the second account may be administered by the provider computing system. The set of payments may comprise a payment to be evaluated, which may be a most recent payment, a recent payment (such as a payment in a current or previous payment cycle), or another payment. The payment to be evaluated need not be in the set of past payments if the payment is a current in-process payment that is being evaluated during processing. The method may comprise determining that the payment is anomalous. The payment may be determined to be anomalous at least in part by determining that an actual categorization for the payment does not match a predicted categorization for the payment. Determining the actual categorization does not match the predicted categorization may be based at least in part on the set of payments (e.g., based at least in part on categories for payments in the set of payments). The method may comprise determining that the payment is problematic. The payment may be determined to be problematic according to a set of one or more predetermined criteria. The payment may be determined to be problematic based at least in part on the experiences of the user and/or on the experiences of other users with similar behaviors. The method may comprise transmitting an alert to an intermediary device. The alert may be transmitted to the intermediary device in response to determining that the payment (e.g., the most recent payment or the current in-process payment) is anomalous and/or problematic. The alert may identify the user and/or the payment. The alert may alternatively or additionally indicate there is a potential issue with the payment.

In one or more implementations, the intermediary device may be a call center device. The method may comprise initiating a voice or video call with a user device of the user. The voice or video call may be initiated via the call center device.

In one or more implementations, the intermediary device may be a user device of the user. The alert may be part of an email message and/or a text message transmitted to the user device.

In one or more implementations, the intermediary device may be a user device of the user. The alert may be a pop-up message presented via a mobile application running on the user device.

In one or more implementations, the intermediary device may be a user device of the user. The alert may be a push notification. The push notification may be triggered on the user device via a push notification service.

In one or more implementations, the tracking device may be a part of the provider computing system.

In one or more implementations, the tracking device may be a user device running a mobile application used to initiate each payment in the set of payments.

In one or more implementations, determining that the payment (which may be the most recent payment, a current in-process payment, or another payment being evaluated) is anomalous may comprise generating a first set of categories with one category corresponding to each payment in the set of payments. The payment may correspond with the actual categorization. Determining that the payment is anomalous may comprise generating a second set of categories that includes the categories in the first set of categories except for the actual categorization. Determining that the payment is anomalous may comprise using the second set of categories to determine the predicted categorization for the payment. Determining that the payment is anomalous may comprise determining that the predicted categorization does not match the actual categorization. Determining that the payment is anomalous may comprise flagging the payment as anomalous. The payment may be flagged as anomalous in response to determining that the predicted categorization does not match the actual categorization.

In one or more implementations, generating the first set of categories comprises applying clustering to payment amounts in the set of payments. The clustering may be unsupervised clustering. The clustering may be k-means clustering.

In one or more implementations, a maximum number of different categories permitted in the first set of categories may be determined.

In one or more implementations, determining the predicted categorization may comprise applying a hidden Markov model and/or a recurrent neural network to the second set of categories.

In one or more implementations, at least a first portion of the payment (which may be the most recent payment, a current in-process payment, or another payment being evaluated) may be reversed by returning the at least first portion back to the first account. Alternatively or additionally, at least a second portion of the payment may be reallocated from the second account to a third account. The third account may be administered by the provider computing system and/or by another computing system.

In one or more implementations, the set of predetermined criteria may comprise whether a number of phone calls with the user exceeds a first threshold. Alternatively or additionally, the set of predetermined criteria may comprise whether a depletion metric for the payment being evaluated exceeds a second threshold. The depletion metric may correlate with what percentage of funds is depleted from, or remaining in, the account.

Various embodiments of the disclosure relate to a method that may be implemented by a provider computing system. The method may comprise generating a first value set. The first value set may comprise payment amounts for payments made by a user. The payments may be made from a first account to a second account. The payments may be already-processed payments and/or current in-process payments. The first account and/or the second account may be administered by the provider computing system. The first value set may include a payment amount for a payment to be evaluated, which may be a most recent payment amount for a most recent payment. The method may comprise generating a second value set. The second value set may comprise categories for payment amounts in the first value set. The second value set may include a most recent category for the most recent payment amount (or other payment amount being evaluated). The method may comprise generating a third value set. The third value set may comprise categories in the second value set except for the most recent category (or payment category for another payment being evaluated). The method may comprise feeding the third value set to a predictor. The method may comprise receiving from the predictor a predicted category for the most recent payment amount (or for another payment amount being evaluated). The method may comprise determining that the most recent category does not match the predicted category for the most recent payment amount (or for another payment amount being evaluated). The method may comprise transmitting an electronic notification to an intermediary device. The electronic notification may identify the most recent payment (or another payment being evaluated). Alternatively or additionally, the electronic notification may identify the user. Alternatively or additionally, the electronic notification may provide an identifier corresponding with an identified issue. Alternatively or additionally, the electronic communication may provide a link which, when activated, retrieves and/or presents more information related to an identified issue.

In one or more implementations, the method may comprise determining that the most recent payment (or another payment being evaluated) is problematic because data in a user profile of the user satisfies one or more predetermined criteria. The electronic notification may be transmitted in response to determining that the most recent category (or another payment category) does not match the predicted category. Alternatively or additionally, the electronic notification may be transmitted in response to determining that the most recent payment is problematic. Alternatively or additionally, the electronic notification may be transmitted in response to determining both that the most recent category does not match the predicted category and that the most recent payment is problematic.

In one or more implementations, the intermediary device may be a user device of the user. The electronic notification may include an email message, a text message, a push notification, and/or a pop-up message. The pop-up message may be presented via a mobile application running on the user device. The electronic notification may include one or more selected from a group. The group may consist of an email message, a text message, a push notification, and/or a pop-up message of a mobile application running on the user device.

In one or more implementations, the intermediary device may be a call center device. The electronic notification may identify the user and/or the most recent payment (or other evaluated payment).

In one or more implementations, the method may comprise initiating a voice or video call with a user device of the user.

Various embodiments of the disclosure relate to a system which may be a provider computing system. The system may comprise a network interface configured to communicate with devices via a telecommunication network. The system may also comprise a processor and a memory storing instructions which, when executed by the processor, cause the processor to perform specific functions. The instructions, when executed, may cause the processor to receive payment data for a user. The payment data may identify payments made by the user. The payments may be made from a first account to a second account. One or both of the first and second accounts may be administered by the provider computing system. The payments may include a payment to be evaluated (which may be the most recent payment, a current in-process payment, or another payment). The instructions, when executed, may cause the processor to determine that the most recent (or another) payment is anomalous. The most recent payment may be determined to be anomalous at least in part by generating categories for the payments in the payment data. The categories may include a most recent payment category corresponding to the most recent payment. The most recent payment may be determined to be anomalous at least in part by determining that a predicted category for the most recent payment does not match the most recent payment category. The instructions, when executed, may cause the processor to determine that the most recent (or another) payment is also problematic. The most recent payment may be determined to be problematic based at least in part on data in a user profile of the user. The data may satisfy one or more predetermined criteria. The instructions, when executed, may cause the processor to transmit an electronic communication to at least one of a call center device and a user device of the user. The electronic communication may be transmitted via the network interface. The electronic communication may indicate an issue has been detected with a recent payment.

In one or more implementations, the instructions may cause the processor to transmit the electronic communication so as to cause the user device to present at least one selected from a group. The group may consist of an email message, a text message, a push notification, and/or a pop-up message.

In one or more implementations, the instructions may cause the processor to initiate a voice or video call with the user device of the user. The voice or video call may be initiated via the call center device.

These and other features, together with the organization and manner of operation thereof, will become apparent from the following detailed description and the accompanying drawings.

BRIEF DESCRIPTION OF THE DRAWINGS

FIGS. 3A-3F depict an overview of example approaches for detecting anomalous payments, with FIGS. 3A, 3C, and 3E illustrating example approaches of payment clustering and FIGS. 3B, 3D, and 3F illustrating example approaches for making a prediction corresponding to a payment, according to potential embodiments.

FIG. 5A depicts an example user interface of a website or application allowing for initiation of a new payment, and FIG. 5B depicts an example user interface of the website or application confirming that the new payment has been submitted, according to potential embodiments.

FIG. 7A depicts an example user interface of a user device showing options presented to a user for resolving an anomalous payment, and FIG. 7B depicts an example user interface of the user device showing an action taken with respect to the payment of FIG. 7A, according to potential embodiments.

DETAILED DESCRIPTION

Figure 1:
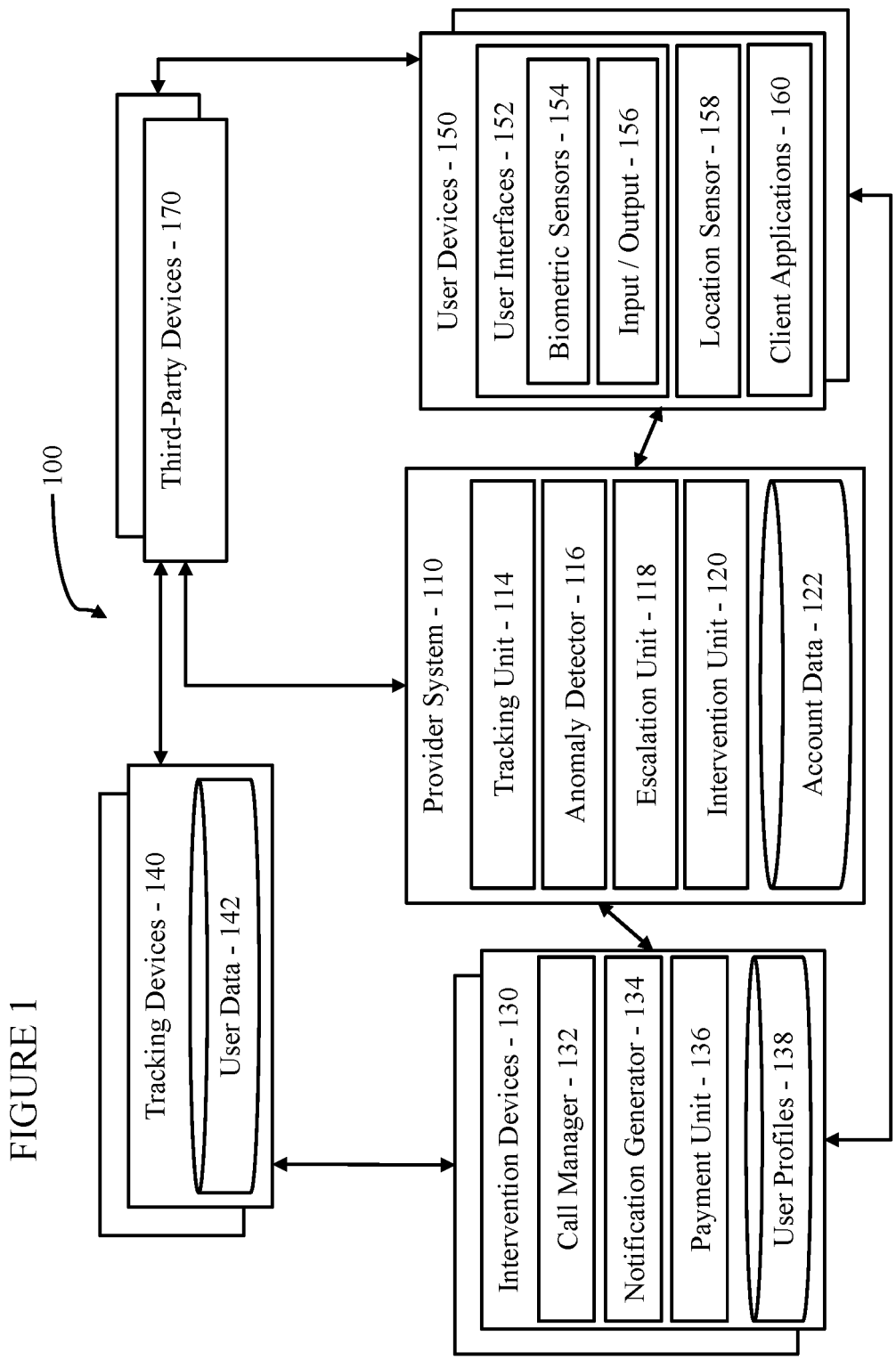
FIG. 1 is a block diagram of an example computer-implemented system, with a provider system in communication with various systems and devices, according to potential embodiments.

Various embodiments described herein relate to systems, methods, and devices for identifying an anomalous user payment based on payment patterns and/or behaviors of a user, determining whether the anomalous payment is problematic, especially in the context of past experiences with the user and the user's circumstances, and implementing intervention mechanisms for proactively resolving account issues before downstream impacts, such as collections calls, inbound calls, and complaints. A payment may be a past payment that has already been processed (e.g., funds transfer has begun or completed), an in-process payment that is deemed to be anomalous and/or problematic after the payment is submitted but before processing is completed, or a payment request that is evaluated while the payment request is being submitted by the user (e.g., after details are entered into a mobile application or website, but before the payment request is confirmed by the user).

An example model for detecting anomalous payment detection may involve using clustering, such as an unsupervised k-means clustering algorithm, to categorize past payment behavior for a particular user. Payments from a predetermined time period (e.g., 18 months of customer payment behavior) may be clustered into a certain number of categories. The most recent payment received may be removed and a predictor (e.g., a Markov model and/or a recurrent neural network (RNN)) may be applied to predict the cluster of the next payment. The cluster predicted using a Markov model and/or an RNN and the actual cluster (obtained, e.g., using k-means clustering) may be compared. If the actual cluster and the predicted cluster do not match, the payment may be flagged as anomalous. If there is a tie in the prediction, the most recent cluster may be chosen. Payments may be scored regularly (e.g., on a daily basis) for new payments submitted since the prior sampling or reporting (e.g., since the prior day).

Once anomalous payments are identified, logic may be applied to identify problematic anomalous payments. An anomalous payment may be deemed to be problematic based on the user's history (e.g., frequent call-ins and/or payment reversals) and circumstances (e.g., whether a payment depletes the user's bank account, whether an automated payment occurred despite cancellation of the automated payment, whether a user who has made an anomalous overpayment with respect to one loan has recently made a similar overpayment with respect to another loan, suggesting the overpayment was intentional and therefore not warranting intervention).

An appropriate intervention may then be determined for payments deemed anomalous and/or problematic. These may include a phone call, email, alert/notification to a mobile application, and/or other reach-out to the user. If the intervention to be implemented is a phone call to the customer or preparation for a phone call from the user, appropriate details (and potentially a script and/or one or more proposed remedies) can be routed to the call center and/or added to the user's account/profile. This helps avoid the situation in which a representative in the call center who knows nothing about the situation receives a call from an escalated user (who may be upset about a mistaken withdrawal and depleted account). Not only are such calls time-consuming and costly, but such situations, involving diverse customers, different representatives, and unique circumstances, may not be handled with adequate consistency (potentially harming service quality). After a productive call, a user may feel as though his or her issue was adequately resolved, but is not expected to be pleased to have needed to take the time to make the call and explain the situation, and he or she would most likely have preferred the issue to have been resolved sooner and more efficiently. In other situations, an alert or notification can be sent to the user's mobile device, and various selectable response options suited to the situation may be presented to the user via an application running on the mobile device. In yet other circumstances, an email, text message, and/or automated call (a "robo-call") can be triggered for transmission to one or more user devices. Based on the specific circumstances, processed payments may be reversed or modified, in-process payments may be canceled or modified, and payment requests may be canceled or modified.

Referring to FIG. 1, a block diagram of an example system 100 enabling detection and pro-active resolution of anomalous payments, according to potential embodiments, is depicted. The system 100 includes a provider system 110 (e.g., a computing system of a financial institution or other service provider), which may be implemented using one or more computing devices. The system 100 may also include one or more intervention devices 130 (for implementing an intervention to address anomalous and/or problematic payments), tracking devices 140 (for tracking payments), user devices 150 (such as smartphones, tablet computers, wearable devices such as smartwatches, smart assistants/smart speakers, etc.), and third-party devices 170. The components of the system 100 may be communicably and operatively coupled to each other over a network that permits the direct or indirect exchange of data, values, instructions, messages, and the like (represented by the double-headed arrows in FIG. 1).

Each system or device in system 100 may include one or more processors, memories, network interfaces, and user interfaces. The memory may store programming logic that, when executed by the processor, controls the operation of the corresponding computing system or device. The memory may also store data in databases. The network interfaces allow the computing systems and devices to communicate wirelessly or otherwise. The various components of devices in system 100 may be implemented via hardware (e.g., circuitry), software (e.g., executable code), or any combination thereof. Devices and components in FIG. 1 can be added, deleted, integrated, separated, and/or rearranged in various embodiments of the disclosure.

Provider system 110 may comprise a tracking unit 114 that tracks payments and generates payment sets for various time periods and for specific customers. An anomaly detector 116 may accept past payments and determine whether a payment (e.g., the most recent payment or a current in-process payment) is anomalous. Escalation unit 118 may determine whether an anomalous payment is problematic and should thus be escalated for review and potential intervention. Intervention unit 120 may determine options, in a fully or partly automated fashion, for resolving an escalated payment. Account data 122 for users (such as user profiles, payment histories, communications from and to account holders, etc.) may be stored in one or more databases.

System 100 may include one or more intervention devices 130, which may be devices involved in the implementation of various interventions, such as devices of a call center, email servers, etc. Intervention devices 130 may include a call manager 132 for initiating, recording, tracking, and/or archiving phone calls with users. An alert/notification generator 134 may transmit notifications and alerts directly or via other devices, such as push notification servers. Payment unit 136 may make changes to payments (partial or full cancelations, reversals, reallocations, etc.). Payment histories and user behaviors—for example, behaviors in response to past payments which may have been anomalous, by a particular user and/or by similarly-situated users in similar circumstances—may be included in user profiles 138 stored in one or more databases.

User devices 150 may include one or more user interfaces 152, which may include one or more biometric sensors 154 (such as a fingerprint reader, a heart monitor that detects cardiovascular signals, an iris scanner, etc.). User interfaces 152 may also include input/output components 156 that provide perceptible outputs (such as displays and light sources for visually-perceptible elements, a speaker for audible elements, and haptics for perceptible signaling via touch, etc.), that capture ambient sights and sounds (such as cameras, microphones, etc.), and/or that allow the user to provide inputs (such as a touchscreen, stylus, force sensor for sensing pressure on a display screen, etc.). One or more user devices 150 may include one or more location sensors 158 to enable the user device 150 to determine its location relative to, for example, other physical objects or relative to geographic locations. Example location sensors 158 include global positioning system (GPS) devices and other navigation and geolocation devices, digital compasses, gyroscopes and other orientation sensors, as well as proximity sensors or other sensors that allow the user device 150 to detect the presence and relative distance of nearby objects and devices. The user devices 150 may include client applications 160, such as an Internet browser presenting websites, and applications provided or authorized by the entity implementing or administering the provider system 110 and/or by the entity implementing or administering the third-party devices 170. Third-party devices may be devices of other financial institutions, credit agencies, governmental bodies, or other entities with data on users making payments, and/or data on payments made by users.

Figure 2:
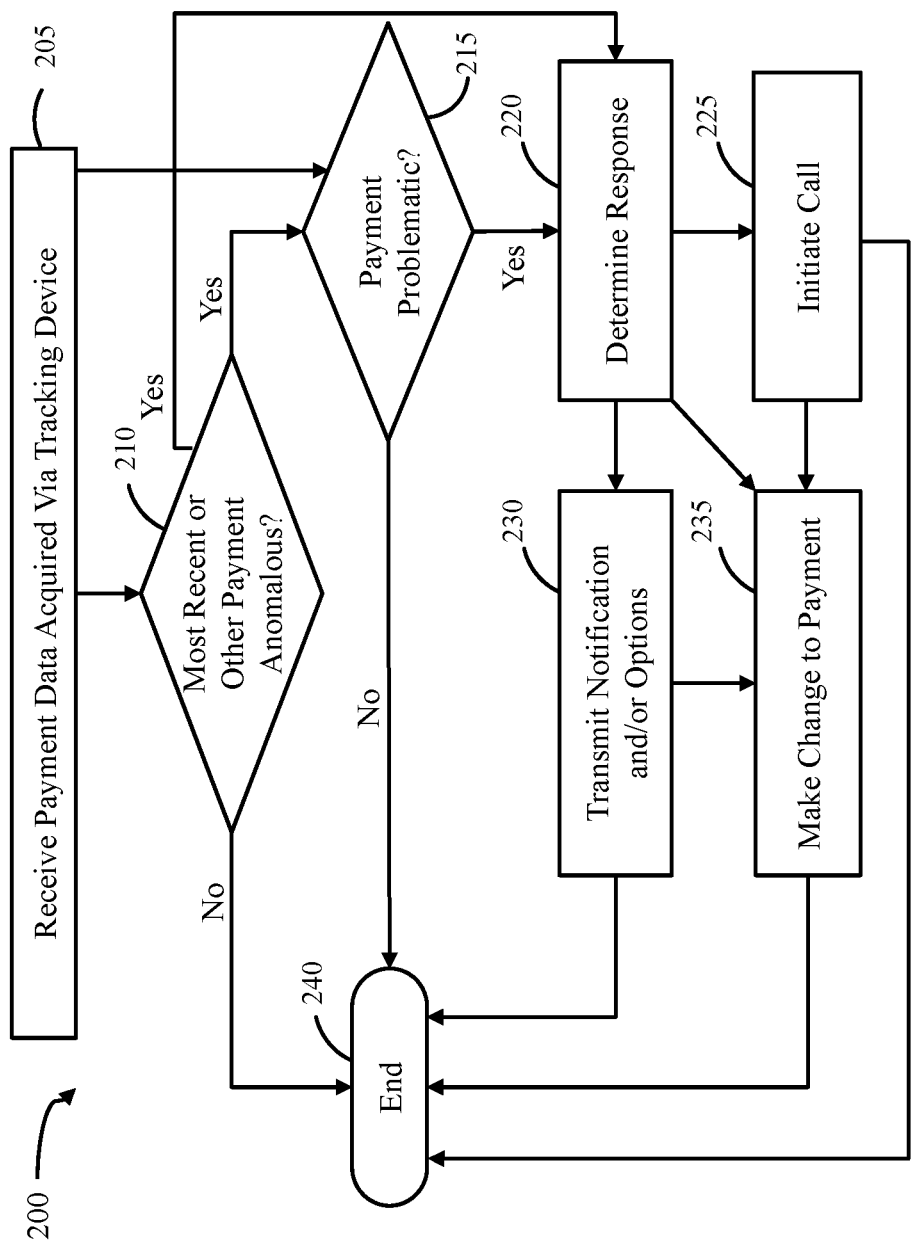
FIG. 2 depicts an example approach for payment evaluation and remediation, according to potential embodiments.

FIG. 2 provides an overview of an example payment issue detection and remediation process 200, according to potential embodiments. The process may be implemented by the provider system 110, with involvement by one or more intervention devices 130, tracking devices 140, user devices 150, and/or third-party devices 170. At 205, provider system 110 (via, e.g., tracking unit 114) may receive payment data via a tracking device 140 (which may be a part of provider system 110 or separate therefrom). Payment data may be received in real-time or near real-time (e.g., as payments are submitted or processed), or periodically (e.g., on an hourly, nightly, or other basis). Tracking device 140 may be any device through which payments are initiated, processed, and/or monitored. In some implementations, a user device 150 through which a user makes payments may serve as a tracking device 140. In other implementations, the tracking device 140 may be a component of provider system 110, which may accept, process, and/or maintain records of payments as account data 122.

At 210, the provider system 110 (via, e.g., anomaly detector 116) may determine whether a payment, received by tracking unit 114, is anomalous. In various embodiments, the most recent payment, a current in-process payment, or another payment is analyzed for being anomalous in the context of prior payments (e.g., other payments over the past 6, 12, 18, or 24 months or other time period). In some implementations, other payments or other payment characteristics (other than payment amount, such as payment timing and method) may be analyzed. An example process of detecting anomalous payments is depicted in FIG. 3.

At 215, if a payment is deemed anomalous (210), the provider system 110 (via, e.g., escalation unit 118) may determine whether the anomalous payment is also problematic (as further discussed below). If the anomalous payment is deemed problematic (215), then at 220, provider system 110 (via, e.g., intervention unit 120) may determine a suitable response. In certain embodiments, a response may be determined at least in part via a user interface (such as interface 400 in FIG. 4) that accepts user entries for how to proceed. Alternatively or additionally, a suitable response may be determined automatically (without human intervention) based on such factors as payment amount, depletion metrics, and indicators of urgency, such as impending payments that would be rejected for insufficient funds (e.g., upcoming automatic drafts to be made within a short period, such as 24 hours, 3 days, 1 week, or another time period).

Figure 6B:
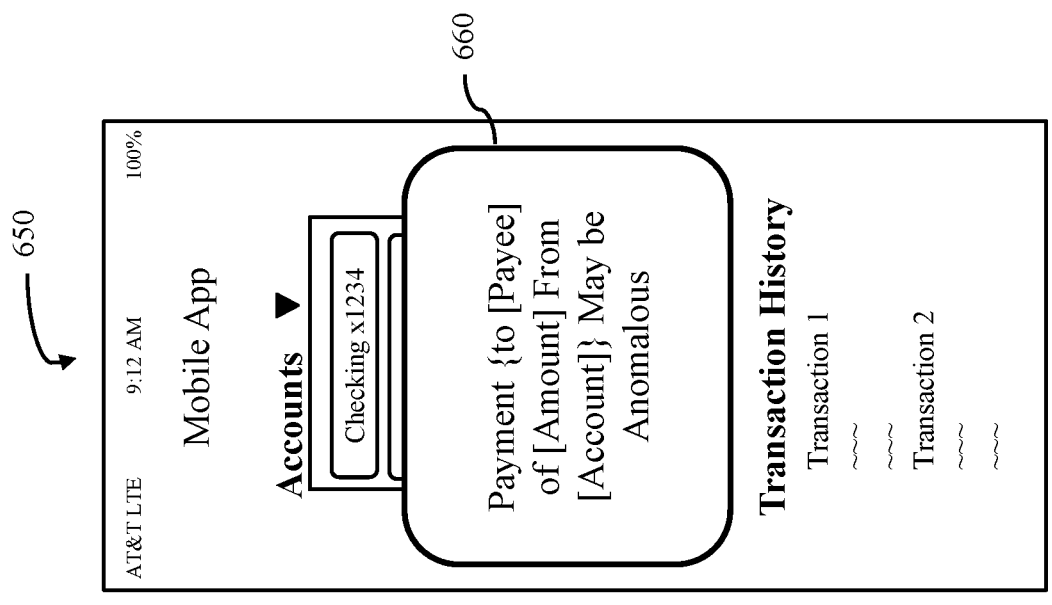
FIGS. 6A and 6B depict example user interfaces of a user device showing notifications, according to potential embodiments.
Figure 6A:
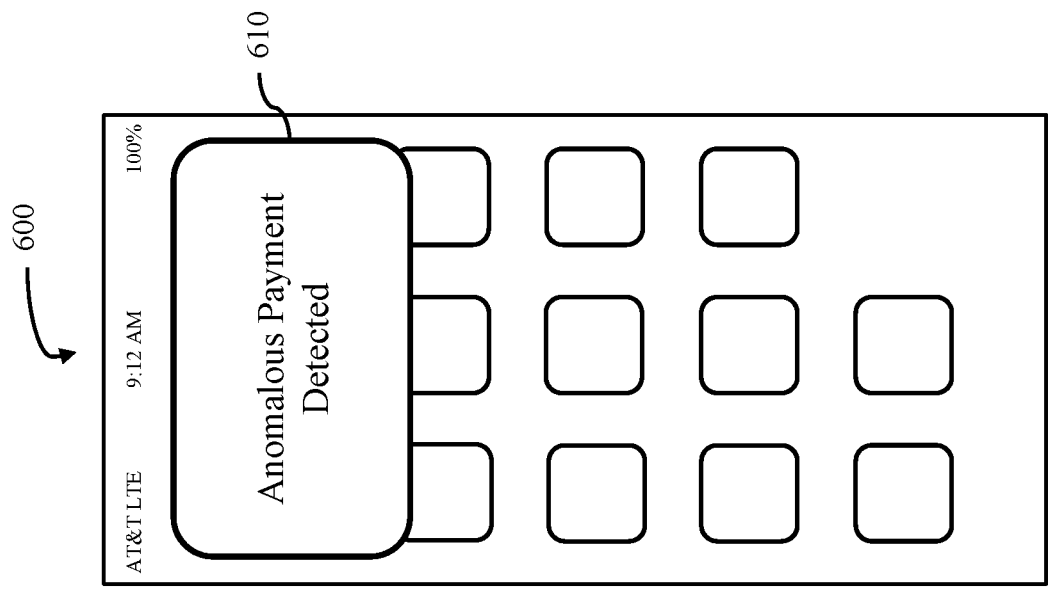

Once a suitable response has been determined, one or more intervention devices 130 may implement the response(s). At 225, an intervention device 130 (such as a call center device with voice over IP or other telephony capabilities) may initiate a phone call (via, e.g., call manger 132) with a user device 150 associated with the account holder in a user profile 138. The call may be, for example, a robo-call and/or a call with a live agent. Alternatively or additionally, at 230, an intervention device 130 (via, e.g., notification generator 134) may transmit a notification (e.g., an email, text message, push notification, and/or pop-up notification) to a user device 150 to alert a user of an anomalous and/or problematic payment (see, e.g., FIGS. 6A and 6B). The intervention device 130 may also transmit instructions to a user device 150 to cause a client application 160 running on the user device 150 (e.g., a banking app) to present options to the user (see, e.g., FIG. 7A). Based on the call (225) and/or on the user's reply or instructions with respect to options presented (230), at 235, an intervention device 130 (via, e.g., payment unit 136) may make a change to the payment (see, e.g., FIG. 7B), such as cancelation (if not already processed), reversal (if already paid), or reallocation (to change accounts debited and/or credited).

In certain implementations, after a response is determined (220), the intervention device 130 (via, e.g., payment unit 136) may make a change to the payment (235). The change may be made with or without initiation of phone calls (225) and/or with or without transmission of notifications/options (230). In some implementations, a tiered response may be implemented based on a score (such as a "problematic" score, discussed below). A low score (e.g., below a first threshold) may be deemed to warrant a certain low-tier response (e.g., a pop-up message via a mobile app), a medium score (e.g., at or above the first threshold but below a second threshold) may be deemed to warrant a different, mid-tier response (e.g., a robo-call, push notification, and/or presentation of remediation options via a mobile application), and a high score (e.g., at or above the second threshold) may be deemed to warrant another different, high-tier response (e.g., a call by a live agent).

At 240, process 200 may end if the payment being evaluated (e.g., the most recent payment or a current in-process payment) is not deemed to be anomalous (210), if an anomalous payment is not deemed problematic (215), once a call has been initiated/completed (225), after a notification and/or options are transmitted to a user device 150 (230), and/or after a change to the payment has been made (235). In various embodiments, a response may be determined (220) and an intervention may potentially be implemented, if a payment is deemed problematic (215), without a determination that the payment is anomalous (210) based on patterns in prior payments (i.e., process 200 may proceed from 205 directly to 215). Similarly, a response may be determined (220) and an intervention may potentially be implemented if a payment is deemed anomalous (210) based on patterns in prior payments, without also determining that the anomalous payment is problematic (215) (i.e., process 200 may proceed from 210 to 220).

Illustrated in FIGS. 3A and 3B are example processes for anomalous payment detection (performed by, e.g., tracking unit 114 and anomaly detector 116 of provider system 110). Referring to FIG. 3A, the tracking unit 114 generates a set of payment values corresponding with a sequence of 12 consecutive monthly payments (labeled "1st" through "12th"). In certain implementations, the number of past payments analyzed may be greater or fewer than 12. In some implementations, 18 monthly payments may be analyzed. In various embodiments, the payment values may be received from one or more tracking devices 140 (which may store payment values as user data 142). In some embodiments, payment values may alternatively or additionally be stored as account data 122, and the tracking unit 114 may generate the set of payment values using payment data that is stored as account data 122.

In FIG. 3A, 10 of the 12 payments are 1350.61, but the tenth payment is 300 and the most recent (twelfth) payment is 270. The most recent payment may, in various embodiments, be a current in-process payment or an already-processed payment. Anomaly detector 116 may use a clustering algorithm to categorize the payments into clusters A, B, and C. Cluster A includes the 1350.61 payments, Cluster B includes the 300 payment, and Cluster C includes the 270 payment. The number of clusters can be variable depending on the number of payments and/or on the values in the set of payment values. In some implementations, the number of clusters can be predetermined so as to fit the payments into a desired number of clusters. In various implementations, the cubic clustering criterion (CCC) statistic may be calculated (from SAS procedure FASTCLUS) to determine the maximum number of clusters to allow for each payment recipient (e.g., for each loan). CCC may be calculated against the number of clusters (e.g., ranging from 2-12) to determine an optimal number. In some implementations, one cluster may be added to the number of clusters at which the local maximum of CCC occurs. In certain implementations, the maximum number of clusters does not necessarily mean that a set of payment values will be categorized into the maximum number of clusters, but rather that the cluster analysis is given the option to go up to the maximum number of clusters.

In various embodiments, payment values in the set can be categorized using a k-means clustering algorithm that is unsupervised, with no dependent variable associated therewith. Alternatively or additionally, other approaches can be used to detect a sequence or pattern of behavior in payments and/or to detect uncharacteristic behavior. Examples include long short term memory (LSTM) recurrent neural networks (RNNs), gradient boosted trees, logistic regression, hidden and basic Markov models, and frequent pattern growth.

In various implementations, clusters may be developed using, for example, SAS, R, Python, Spark and/or H2O. For example, in certain versions, k-means may be developed using the SAS FASTCLUS procedure, which performs a disjoint cluster analysis on the basis of distances computed from one or more quantitative variables. The observations may be divided into clusters such that every observation belongs to one and only one cluster. The clusters do not form a tree structure. The FASTCLUS procedure uses Euclidean distances, so the cluster centers are based on least-squares estimation. This kind of clustering method is often called a k-means model. The clustering aims to partition n observations into k clusters in which each observation belongs to the cluster with the nearest mean. The final cluster centers are the means of the observations assigned to each cluster when the algorithm is run to complete convergence. Each iteration reduces the least-squares criterion until convergence is achieved.

For example, given a set of observations $(x_1, x_2, \ldots, x_n)$, where each observation is a d-dimensional real vector, k-means clustering aims to partition the n observations into $k (\leq n)$ sets $S = \{S_1, S_2, \ldots, S_k\}$ so as to minimize the within-cluster sum of squares ("WCSS") (i.e. variance). Formally, the objective is to find:

$$\arg\min \Sigma_{i=1}^{k} \Sigma_{x \in S_i} \|x - \mu_i\|^2 \qquad \text{Eq. 1}$$

where $\mu_i$ is the mean of points in $S_i$.

Referring to FIG. 3B, the cluster categorizations may be organized into a historical sequence of payment categories. Anomaly detector 116 may generate a set (labeled "actual") that includes categories corresponding to the 12 consecutive payments in the set of payment values (labeled "1st" through "12th"). Accordingly, 10 of the 12 categories in the "actual" set are "A," except for the tenth category of "B" corresponding to the 300 payment, and the twelfth category of "C" corresponding to the 270 payment. The anomaly detector 116 may then generate another set (labeled "trained") that includes the categories in the "actual" set, except for the most recent payment (or otherwise the payment being assessed for whether the payment is anomalous). That is, the "trained" set is the "actual" set with the payment being assessed removed.

Anomaly detector 116 may feed the "trained" set of payment clusters to a predictor (which may be part of the anomaly detector 116) to predict the category or cluster corresponding to the most recent (twelfth) payment. The anomaly detector 116 may then compare the predicted cluster for the payment being evaluated (e.g., the category predicted for the most recent payment) to the actual cluster from the clustering algorithm (e.g., the actual category for the most recent payment). If the two clusters do not match, the anomaly detector 116 flags the payment being evaluated (here, the twelfth payment) as being anomalous. In FIG. 3B, the anomaly detector 116 has predicted a 75% probability that the most recent payment would fit into Cluster A, a 13 percent probability that the most recent payment would fit into Cluster B, and a 12 percent probability that the most recent payment would fit into Cluster C. That is, a payment value that would be categorizable in Cluster A would be most expected (i.e., most likely at 75 percent), and a payment value that would be categorizable in Cluster C would be least expected (i.e., least likely at 12 percent). Consequently, if the most recent payment value is actually in Cluster C, it would be deemed anomalous. In certain implementations, a most recent payment value that is actually in Cluster B may also be deemed anomalous due to its relatively low likelihood.

In certain situations, the predictor may predict two categories (for the payment value being evaluated) with equal likelihood. For example, the most recent payment may be predicted to be a payment that has a 40% probability of fitting into Cluster A and a 40% probability of fitting into Cluster B, with no preference (e.g., no statistically significant greater likelihood) for one cluster over the other cluster. In such a case, anomaly detector 116 may choose the cluster most recently observed in the payment sequence as the predicted cluster. For example, in FIG. 3B, if Cluster A and B were equally likely, because Cluster A is most recently observed (at the "11th" position), the anomaly detector 116 may select Cluster A as the predicted cluster because it occurred more recently than Cluster B.

Payment behavior patterns can vary in three primary ways: 1) changes to payment amount (as discussed above); 2) changes to payment timing (e.g., early, on-time, or late payment); and 3) changes to payment method (e.g., online, check, mobile application, over the phone, in-person, etc.). In various embodiments, changes in another payment characteristic, or changes in multiple payment characteristics, may be analyzed to determine whether a payment is anomalous. For example, referring to FIG. 3C (which includes the same cluster labels and probabilities as in FIG. 3A for illustration purposes), the hypothetical characteristic that is analyzed is method of payment. The set of payment values includes values for how the user made payments (for payments labeled "1st" through "12th"). Ten of the 12 payments were made using a mobile application (client application 160) running on a user device 150, while the tenth payment was made over the phone and the twelfth (most recent) payment was made in person. In some implementations, each method of payment may be assigned an appropriate numeric value if needed for the algorithm that is to be used to cluster the payment methods; for example, mobile payment may be designated a numeric value of 20, payment over the phone may be designated a numeric value of 50, and in-person payment may be designated a numeric value of 100.

Figures 3C, 3D:
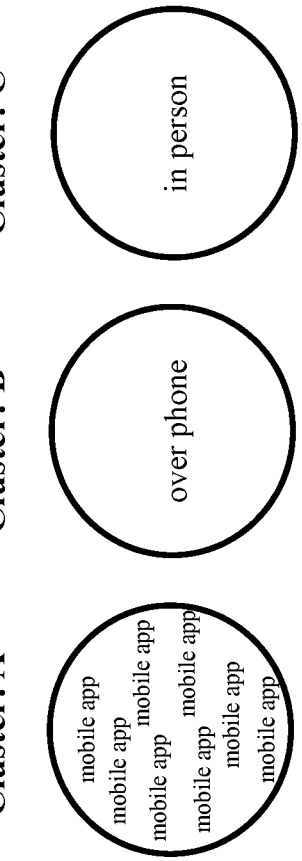

Using a suitable clustering algorithm, payment via mobile app may be categorized as Cluster A, payment over the phone may be categorized as Cluster B, and payment in person may be categorized as Cluster C. Referring to FIG. 3D, the "actual" and "training" payment sets are generated. A predictor is used to predict that the most recent payment would be made via a mobile app. Consequently, the in-person payment at the position labeled "12th" is deemed to be an anomalous payment.

Figures 3E, 3F:
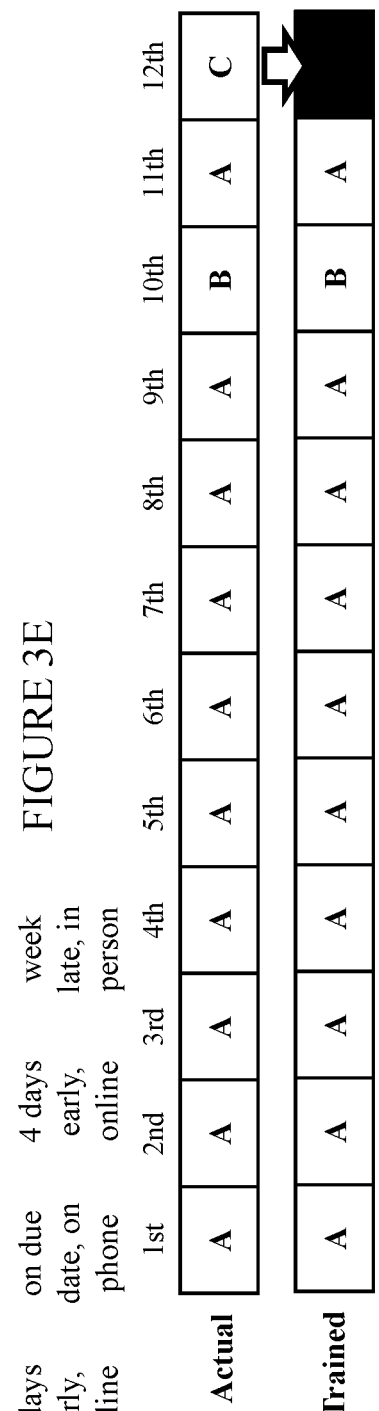

Similarly, referring to FIG. 3E (which includes the same cluster labels and probabilities as in FIGS. 3A and 3C for illustration purposes), the hypothetical characteristic that is analyzed combines method of payment with timing of payment. The set of payment values includes values for how the user made payments as well as timing with respect to payment deadlines (for payments labeled "1st" through "12th"). Ten of the 12 payments were made online (e.g., via an Internet browser accessing a website served by provider system 110) 2-5 days before the due date, while the tenth payment was made over the phone on the due date and the twelfth (most recent) payment was made in person a week after the due date. In some implementations, each combination of payment method and payment timing may be assigned an appropriate numeric value if needed for the algorithm that is to be used to cluster the payment methods; for example, online payment 2-5 days early may be designated a numeric value of 20, payment on the due date over the phone may be designated a numeric value of 50, and in-person payment that is made a week late may be designated a numeric value of 100.

Using a suitable clustering algorithm, payment online within 2-5 days before the due date may be categorized as Cluster A, payment over the phone on the due date may be categorized as Cluster B, and payment a week late and in person may be categorized as Cluster C. Referring to FIG. 3F, the "actual" and "training" payment sets are generated. A predictor is used to predict that the most recent payment would fit in a category corresponding to payments made online 2-5 days before the due date, which does not match the category for the actual payment corresponding to the payment made a week late in person. Consequently, the in-person payment made a week late at the position labeled "12th" is deemed to be an anomalous payment.

In various embodiments, a Markov model may be used (as the "predictor") to predict the cluster of the next payment. Alternatively or additionally, RNNs may be used to predict the cluster of the next payment (the most recent payment, otherwise the payment being evaluated). The Markov approach may be relatively faster and more efficient, but may miss certain complex patterns. RNNs tend to be more intelligent, but also tend to be slower. Ensemble models that combine multiple "individual" (diverse) models together may achieve superior prediction power.

In various embodiments, the model is a dynamic model that is trained on a regular basis (e.g., hourly, daily, nightly, or other time period). Advantages of regular training are illustrated by the following example. Consider a set {20, 50, 50, 50, 20} of payment amounts, corresponding with clusters {1, 2, 2, 2, 1}. If a new payment of 150 is observed, and the above clusters (i.e., 1 and 2) are used, the new payment would be assigned to cluster 2. The cluster predicted by feeding {1, 2, 2, 2, 1} to a Markov model would also be cluster 2. Consequently, the payment value of 150, although anomalous when considering the payment history of 20s and 50s, would not be flagged as anomalous because the actual cluster (i.e., 2) would match the predicted cluster (i.e., 2). If, however, there is regular cluster creation and re-creation, the result is different. Specifically, the set of payment values would be {20, 50, 50, 50, 20, 150}, corresponding with clusters {1, 2, 2, 2, 1, 3}. Here, the predictor (e.g., Markov) would predict a cluster of 2 for the most recent payment value, which does not match the actual cluster of 3 for the most recent payment. Consequently, the most recent payment value of 150 would be flagged as anomalous. This scenario occurs because the new amount (here, a payment of 150) requires a new cluster to properly explain the difference.

In various embodiments, once an anomalous payment is detected, provider system 110 (e.g., via escalation unit 118) may determine whether the anomalous payment is also problematic. An anomalous payment may be determined to be problematic based on, for example, user behaviors and/or user circumstances. In various embodiments, an anomalous payment may be deemed problematic if, for example, the user making the payment (or other users in similar circumstances and/or other users having similar characteristics such as age range, credit score range, etc.) has contacted the service provider (e.g., via phone, email, and/or chat) one or more times in the past following a similar payment (i.e., another payment with one or more common characteristics, such as amount, timing, account paid from and/or account paid to, etc.).

An anomalous payment may, alternatively or additionally, be deemed to be problematic if the payment has sufficient impact on the account from which the payment was made. The impact may be evaluated based on one or more various metrics, such as a depletion metric. For example, an anomalous payment may be deemed problematic if less than half (or less than a quarter, or another fraction) of the balance remains in the account following the anomalous payment (i.e., a depletion metric of "percentage remaining" is less than a certain threshold percentage such as 50% or 25%), or if less than a certain amount (such as less than $250 or $100 or another amount) remains in the account (i.e., a depletion metric of "amount remaining" is less than a certain threshold amount such as $250). In some implementations, the threshold for a depletion metric may be based on the particular user and his or her circumstances. For example, if after a payment is processed a certain amount is left in the account, and based on account history, the remaining amount is insufficient to cover anticipated expenses and payments (such as automatic drafts, utilities, loans, regular payments, etc.) despite anticipated deposits (e.g., pay from an employer or source of funds), then the payment may be deemed to be problematic. Similarly, an anomalous payment may be deemed not to be problematic if the corresponding account is frequently depleted and replenished by the user.

In other implementations, an anomalous behavior may be deemed problematic based on data from a third-party device 170, such as a trend in the user's credit score from a credit agency. For example, if a user's credit score has recently dropped more than a threshold amount (e.g., 100 or 150 points), below a certain threshold value (e.g., 600 or 500), or more than a certain percentage (e.g., a 15% or 20% drop in credit score), an anomalous payment may be deemed to be more problematic than an anomalous payment made when the user's financial situation has not been recently deteriorating or is increasing.

In various embodiments, various behaviors and circumstances may be evaluated in determining a score, such as a "problematic" score, and if the score exceeds a threshold value, the anomalous payment may be deemed to be problematic. In certain embodiments, various factors may contribute various predetermined point values to the score, and if the sum of the point values exceeds a certain score threshold, the anomalous payment may be considered to be problematic. For example, each prior telephone call or complaint to the service provider by the user may contribute a certain number of points (e.g., 20 points), the percentage reduction in account balance may contribute additional points (e.g., a 50% drop in account balance may contribute 50 points), a drop in credit rating over the past three months may contribute a certain number of points (e.g., a 50 point drop in credit rating may contribute 50 points), an anticipated shortfall for anticipated payments may be deemed to contribute certain points, and so forth. Then, if the score exceeds a certain value, such as 100 or 150 points, then the anomalous payment may be considered problematic.

In various implementations, an anomalous payment may be deemed not to be problematic based on certain behaviors and/or circumstances. For example, if an anomalous payment is a payment above the minimum due for a mortgage (e.g., an extra payment above an amount due for a mortgage), but the user has similarly overpaid one or more other accounts recently (such as a car loan, a credit card balance, etc.), then it may be deemed that the anomalous payment is intentional (and not problematic) because, for example, the user may be attempting to systematically lower his or her debt so as to better position himself or herself for a loan (e.g., by affecting his or her debt-to-income ratio).

Figure 4A:
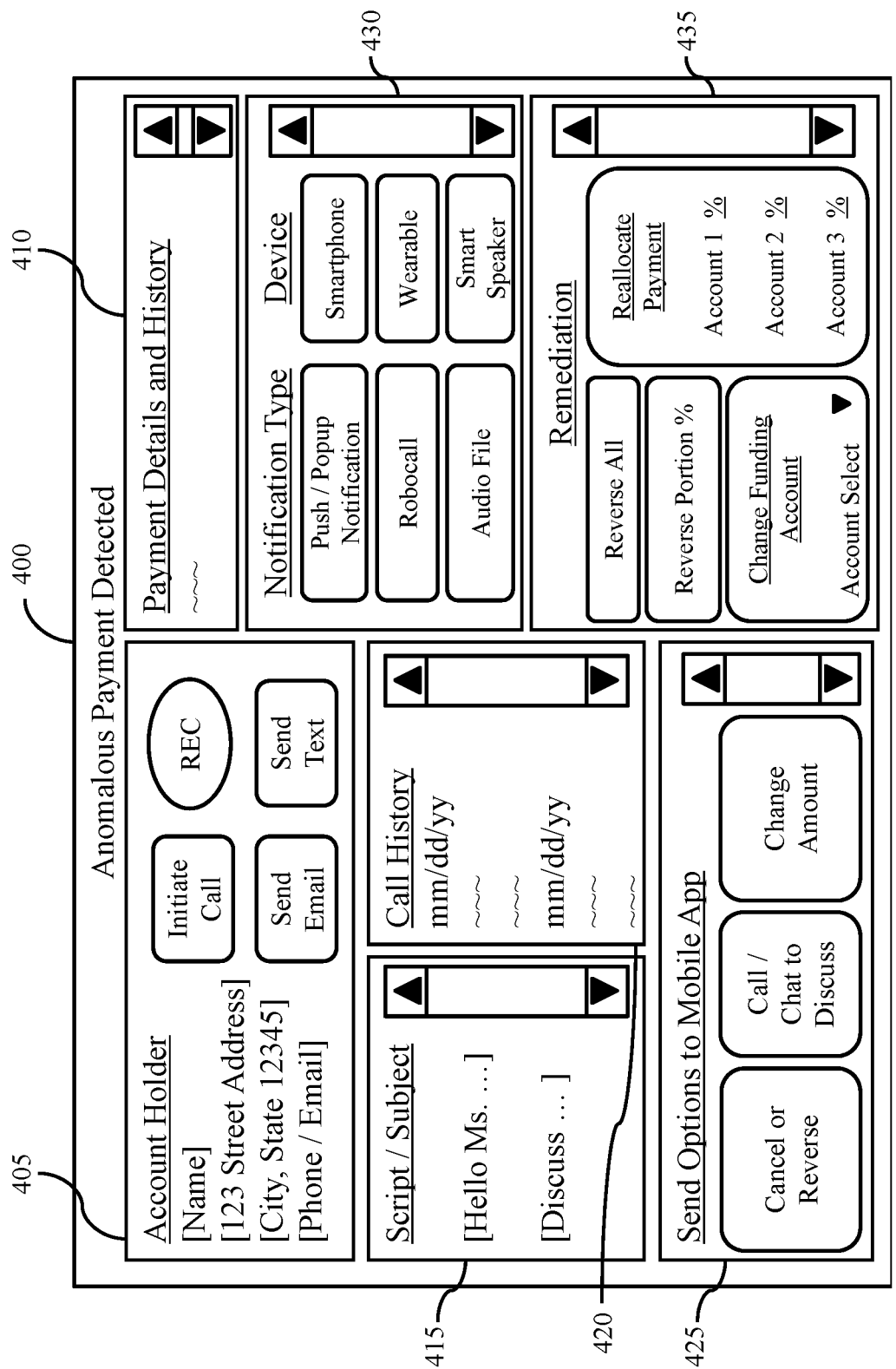
FIGS. 4A-4C depict example user interfaces for selecting responses to anomalous payments, according to potential embodiments.

In various embodiments, the provider system 110 (via, e.g., intervention unit 120) may determine how to proceed at least in part based on user inputs. Referring to FIG. 4A, example graphical user interface (GUI) 400 may be presented (via, e.g., an intervention device 130 and/or the provider system 110) when an anomalous and/or problematic payment is detected, according to potential embodiments. At frame 405, an account holder of an account used to make the anomalous payment is identified. And at frame 410, the payment deemed anomalous may be identified (by date, amount, method, account, etc.), as well as payment history (e.g., information on past payments, such as all payments, or payments made during the past 12 or 18 months or during another time period).

Frame 405 may provide various activatable icons/link for selecting various functions that may be performed via one or more intervention devices 130. For example: an icon for initiating a phone call ("Initiate Call") may allow for initiation of a telephone call via an intervention device 130 of a call center with telephony capabilities; an icon for recording a phone call ("REC") may allow for recording of the telephone call initiated via the intervention device 130 of the call center (via, e.g., a microphone of the intervention device 130); an icon for transmitting an email message ("Send Email") may cause an intervention device 130 that includes and/or accesses an email server to send an email message to a known email address; and an icon for transmitting a text message ("Send Text") may cause an intervention device 130 to send a text message (e.g., an SMS message or a message presented by user device 150 via a client application 160 for sending and receiving text messages).

Figure 4B:
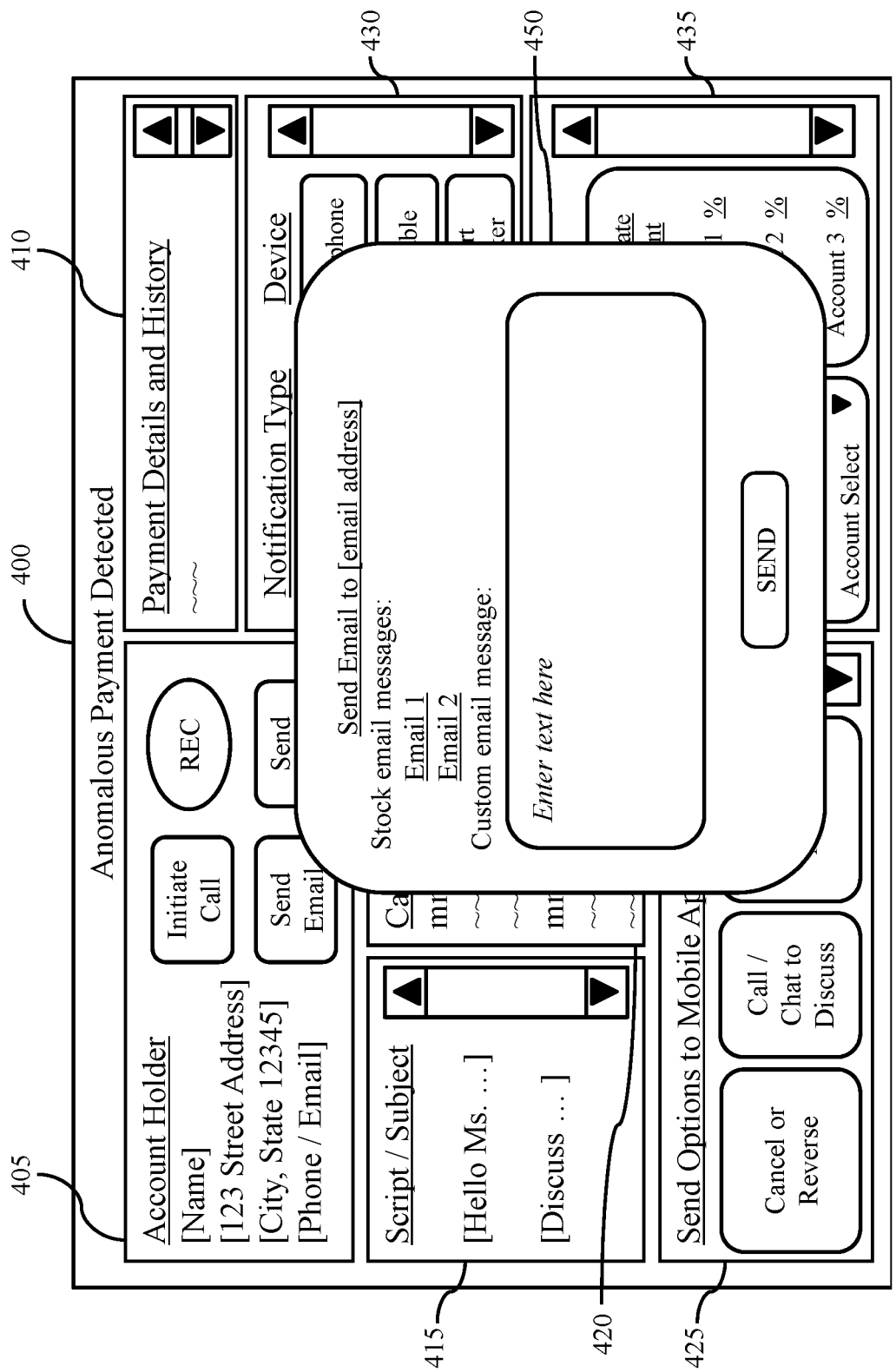
Figure 4C:
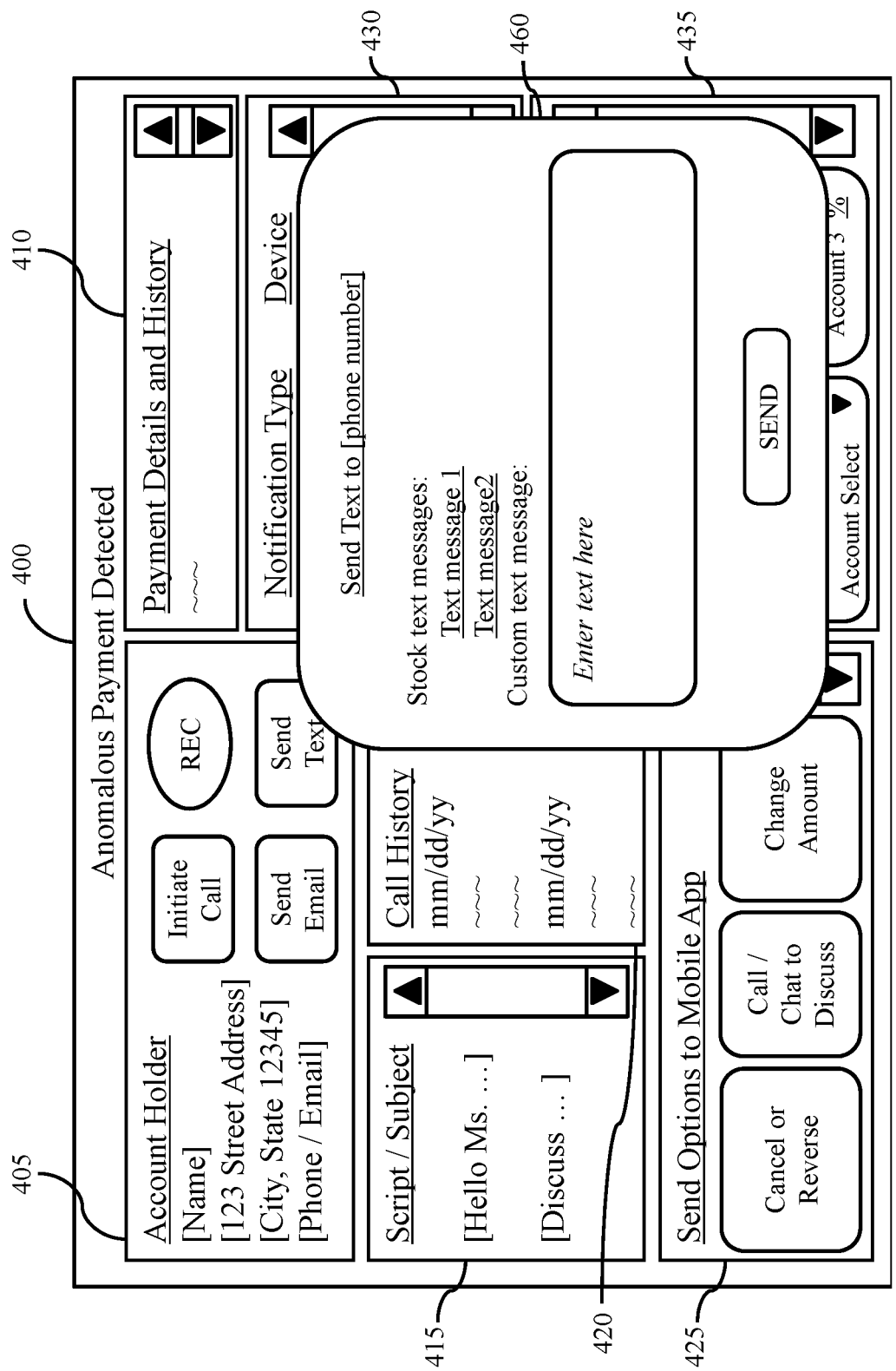

Referring to FIG. 4B, if the "Send Email" icon is selected, an email window 450 may be presented to allow the user to, for example, confirm the email address to be used, select a stock email message, and/or customize the email by entering text to be inserted into the body and/or subject of the email. Similarly, referring to FIG. 4C, if the "Send Text" icon is selected, a text window 460 may be presented to allow the user to, for example, confirm the phone number to be used, select a stock text message, and/or enter a customized text message.

Returning to FIG. 4A, at frame 415, GUI 400 provides a script that may be used by an agent who may call the user (via, e.g., the "Initiate Call" icon of frame 405), or who may receive a call from the user. In some implementations, GUI 400 is viewed by an agent using a call center device (an intervention device 130) when a call is received from the account holder to aid the agent in handling the call more efficiently and uniformly. Frame 420 may present a history of past calls with the account holder, both calls made by agents and calls made by the account holder and received by agents.

At frame 425, GUI 400 may allow an agent to initiate a transmission to a user device 150 (via, e.g., notification generator of intervention device 130) to instruct a client application 160 running on user device 150 to present the user with one or more selectable options. For example, frame 425 allows an agent to provide the user the option to: cancel a payment or, if processed, reverse the payment via a "Cancel or Reverse" icon; initiate a phone call or online chat with an agent to discuss the anomalous payment via a "Call/Chat to Discuss" icon; and/or change the payment amount via a "Change Amount" icon (see, e.g., FIG. 7A).

At frame 430, GUI 400 may allow an agent to initiate a selected notification type to a selected user device 150. For example, frame 430 allows an agent to cause an intervention device 130 to: transmit a push notification (e.g., via push notification server) to a smartphone, a wearable (e.g., smartwatch), a smart speaker, and/or other user devices 150; transmit a pop-up notification to one or more user devices 150 for presentation via a client application 160 running on the user devices 150; initiate a robo-call via an intervention device 130 with telephony capabilities to one or more user devices 150; and/or transmit an audio file (e.g., a spoken message) for presentation via speakers of one or more user devices 150. An example push notification is presented in FIG. 6A at notification 610 of screenshot 600, and an example pop-up notification is presented in FIG. 6B at notification 660 of screenshot 650.

At frame 435, GUI 400 may allow an agent to implement a remediation (via, e.g., payment unit 136 of an intervention device 130) for the anomalous and/or problematic payment. For example, frame 435 may allow the agent to reverse all of the payment, reverse a portion of the payment (by, e.g., providing a percentage to reverse), change the funding account from which the payment is made, and/or to reallocate the accounts receiving the funds from the funding account (by, e.g., providing percentages for various accounts). The frames in GUI 400 include scroll bars on their right sides to allow users to scroll to and view additional selections, functionalities, and information that may not fit on the portion of the frame that is visible when the user is first presented with the corresponding frame of GUI 400 on his or her display screen.

FIGS. 5A and 5B provide example GUIs 500 and 550 for allowing a user to make a payment via a client application 160 (e.g., a mobile banking application of the service provider) according to potential embodiments. The user may identify the recipient of the payment at 505, the payment amount at 510, the source of the funds for the payment at 515, and whether the payment is to repeat (e.g., to set up an automatic draft for a loan). The user may then review and confirm the details for payment by selecting the "next" icon 525, or cancel the payment request via the "cancel" icon 530. If the "next" icon 525 is selected, GUI 550 may be presented. GUI 550 may be a confirmation screen that provides payment details at 555 and allows the user to confirm the payment details and proceed with the payment at 560. In various embodiments, once selection of the "next" icon 525 has been detected, the payment request may be evaluated to determine whether the payment is anomalous and/or problematic. If the payment request is found to be anomalous and/or problematic, a notification/alert may be presented at 565. The notification 565 may be presented with the option to confirm/proceed at 560, in case the user would nonetheless like to proceed with the payment. Notification 565 may include and/or accompany one or more selectable icons. For example, notification 565 may present or accompany a "go back" icon 570 which, when selected, may return the user to, for example, GUI 500 to allow the user to change his or her selections in the payment request (e.g., amount or payee). Notification 565 may alternatively or additionally include or accompany a "cancel" icon 575 which, when selected, may cancel the payment request and return the user to another screen (e.g., a "home page" or account summary screen). And notification 565 may alternatively or additionally include or accompany a "get details" icon 580 which, when selected, may present the user with information on the reason or basis for notification 565 (i.e., reasons or bases for the payment request being identified as potentially being unintended or in error). The "get details" information may be presented on a separate page/screen, via pop-up, in a message, or in another manner. Example reasons may include, for example: "Payment amount differs from amount expected based on payment history"; "Payment amount differs from amount due"; "Payment amount differs from amount predicted"; "Payment amount not expected for selected payee;" "Low average balance in funding account suggests a different funding account may have been intended"; "Payee is unexpected for this payment amount"; "Payment frequency would result in payments exceeding monthly balance"; and so forth.

FIG. 7A provides an example GUI 700 presented via a client application 160 running on a user device 150, according to potential embodiments. The GUI 700, or elements thereof, may become available automatically, or may become available according to selections made via GUI 400 (e.g., via frame 425). At 705, a potentially anomalous and/or problematic payment is identified. At 710, an activatable icon is presented to allow the user to select to request a cancelation or reversal of the anomalous payment. Upon selection of icon 710, client application 160 may transmit to provider system 110 and/or to intervention device 130 a corresponding message to indicate the user has requested that the anomalous payment be canceled (if the payment remains unprocessed), or reversed (if the payment has been processed). At 715, an activatable icon is presented to allow the user to select to change the amount of the anomalous payment. A new amount may be entered at 715. Upon selection of icon 715, client application 160 may transmit to provider system 110 and/or to intervention device 130 a corresponding message to indicate the user has requested that the amount of the anomalous payment be changed and to provide the new amount.

At 720, an activatable icon is presented to allow the user to select to initiate a chat to discuss the anomalous payment with an agent. Upon selection of icon 720, client application 160 may initiate a chat session with intervention device 130 and/or provider system 110. At 725, an activatable icon is presented to allow the user to select to initiate a phone call to discuss the anomalous payment with an agent. Upon selection of icon 725, client application 160 may initiate, via a telephony component of the user device 150 on which the client application 160 is running, a phone call with intervention device 130 and/or provider system 110. In some implementations, upon selection of icon 725, client application 160 running on a first device 150 (e.g., a wearable such as a smartwatch) may initiate the phone call via a telephony component of a second user device 150 (e.g., a smartphone) with which the first user device 150 is in communication (via, e.g., Bluetooth or otherwise).

At 730, an activatable icon is presented to allow the user to choose to leave the payment unchanged. Upon selection of icon 730, client application 160 may transmit a message to intervention device 130 and/or to provider system 110, indicating that a selection has been made not to make any changes to the payment. In some implementations, by default, the intervention device 130 and/or the provider system 110 may deem a lack of a transmission from the user device 150 (e.g., via client application 160) to indicate that the payment is not to be changed.

Referring to FIG. 7B, once a selection is made via GUI 700, the client application 160 running on user device 150 may present the user with GUI 750 to identify a resolution of, or action(s) taken with respect to, the anomalous payment, according to potential embodiments. At 755, GUI 750 may identify the potentially anomalous and/or problematic payment. At 760, GUI 750 may indicate what action has been taken or requested. For example, the anomalous payment may have been canceled or reversed, the payment amount may have been changed, or the anomalous payment may have been left unchanged.

The terms selectable and activatable are used interchangeably herein. Selectable/activatable icons presented as part of example GUIs may cause a signal to be generated upon selection/activation. The signal may be transmitted to a system, device, or application to indicate to the device, system, or application which icon has been selected, and the device, system, or application may respond accordingly.

The embodiments described herein have been described with reference to drawings.

The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method implemented by a provider computing system, the method comprising:
   generating, via a tracking device that tracks payments by a user, a set of past payments made from a first account to a second account, at least one of the first and second accounts being administered by the provider computing system;
   executing, using the set of past payments as input, a recurrent neural network to generate, as output, a predicted categorization for each payment in the set of past payments;
   responsive to generating the predicted categorization by executing the recurrent neural network, executing an unsupervised clustering function to identify an actual categorization for each payment of the set of past payments;
   determining that at least one payment of the set of past payments is anomalous at least in part by determining that the actual categorization for the at least one payment does not match the predicted categorization for the at least one payment;
   determining, responsive to determining that the at least one payment is anomalous, that the at least one payment is problematic according to a set of one or more predetermined criteria;
   in response to determining that the at least one payment is both anomalous and problematic, transmitting an alert to an intermediary device, the alert identifying at least one of the user and the at least one payment;
   receiving, from the intermediary device, responsive to the alert, a request to cancel or reverse the at least one payment; and
   canceling or reversing the at least one payment in accordance with the request.

2. The method of claim 1, wherein the intermediary device is a call center device, and wherein the method further comprises initiating, via the call center device, a voice or video call with a user device of the user.

3. The method of claim 1, wherein the intermediary device is a user device of the user, and wherein the alert is an email message or text message transmitted to the user device.

4. The method of claim 1, wherein the intermediary device is a user device of the user, and wherein the alert is a pop-up message presented via a mobile application running on the user device.

5. The method of claim 1, wherein the intermediary device is a user device of the user, and wherein the alert is a push notification triggered on the user device via a push notification service.

6. The method of claim 1, wherein the tracking device is part of the provider computing system.

7. The method of claim 1, wherein the tracking device is a user device running a mobile application used to initiate each payment in the set of past payments.

8. The method of claim 1, wherein determining that the payment is anomalous further comprises:
   generating a first set of categories with one category corresponding to each payment in the set of past payments, wherein the payment corresponds with the actual categorization;
   generating a second set of categories that includes categories in the first set of categories except for the actual categorization;
   using past payments corresponding the second set of categories as input to the recurrent neural network to determine the predicted categorization for the payment; and
   determining that the predicted categorization does not match the actual categorization.

9. The method of claim 8, wherein generating the first set of categories comprises applying k-means clustering to payment amounts in the set of past payments.

10. The method of claim 9, further comprising determining a maximum number of different categories permitted in the first set of categories.

11. The method of claim 8, wherein determining the predicted categorization further comprises applying a hidden Markov model to the second set of categories in addition to the recurrent neural network in an ensemble model.

12. The method of claim 1, further comprising at least one of:
reversing at least a first portion of the payment by returning at least the first portion back to the first account; and
reallocating at least a second portion of the payment from the second account to a third account.

13. The method of claim 1, wherein the set of one or more predetermined criteria comprises at least one of whether:
a number of phone calls with the user exceeds a first threshold; and
a depletion metric for the payment exceeds a second threshold.

14. A method implemented by a provider computing system, the method comprising:
generating a first value set with payment amounts for already-processed payments made by a user from a first account to a second account, at least one of the first and second accounts being administered by the provider computing system, the first value set including a most recent payment amount for a most recent payment from the first account;
executing an unsupervised clustering function to generate a second value set with categories for payment amounts in the first value set, the second value set including a most recent category for the most recent payment amount;
generating a third value set that includes the categories in the second value set except for a category of a payment amount of a most recent payment of the already-processed payments;
responsive to generating the third value set, executing a recurrent neural network using the third value set as input to generate, as output, a predicted category for the payment amount of the most recent payment of the already-processed payments;
determining that the most recent category does not match the predicted category for the payment amount of the most recent payment of the already-processed payments;
transmitting an electronic notification to an intermediary device, the electronic notification identifying the most recent payment of the already-processed payments; and
receiving, from the intermediary device, responsive to the electronic notification, a request to cancel or reverse the most recent payment of the already-processed payments; and
canceling or reversing the most recent payment in accordance with the request.

15. The method of claim 14, further comprising determining that the most recent payment is problematic because data in a user profile of the user satisfies one or more predetermined criteria, wherein the electronic notification is transmitted in response to determining that the most recent category does not match the predicted category and determining that the most recent payment is problematic.

16. The method of claim 14, wherein the intermediary device is a user device of the user, and wherein the electronic notification includes one or more selected from a group consisting of an email message, a text message, a push notification, and a pop-up message of a mobile application running on the user device.

17. The method of claim 14, wherein the intermediary device is a call center device, and wherein the electronic notification identifies the user and the most recent payment.

18. A provider computing system comprising:
a network interface configured to communicate with devices via a telecommunication network;
a processor and a memory storing instructions which, when executed by the processor, cause the processor to:
receive payment data for a user, the payment data identifying payments made by the user to an account, the payments including a most recent payment;
determine that the most recent payment is anomalous at least in part by:
executing an unsupervised clustering function to generate categories for the payments in the payment data, the categories including a most recent payment category corresponding to the most recent payment;
responsive to executing the unsupervised clustering function, executing, using the payment data as input, a recurrent neural network to generate, as output, a predicted category for the most recent payment;
determining that the predicted category for the most recent payment does not match the most recent payment category;
determine that the most recent payment is problematic based on data in a user profile of the user satisfying one or more predetermined criteria;
transmit, via the network interface, an electronic communication to at least one of a call center device and a user device of the user, the electronic communication indicating an issue has been detected with a recent payment;
receive, responsive to the electronic communication, a request to cancel or reverse the recent payment; and
cancel or reverse the recent payment in accordance with the request.

19. The system of claim 18, wherein the instructions cause the processor to transmit the electronic communication so as to cause the user device to present at least one selected from a group consisting of an email message, a text message, a push notification, and a pop-up message.

20. The system of claim 19, wherein the instructions further cause the processor to initiate, via the call center device, a voice or video call with the user device of the user.

* * * * *